Nov. 10, 1959 R. L. WHITE 2,912,152
MOISTURE RETAINING CONTAINER
Filed Dec. 9, 1957 2 Sheets-Sheet 2

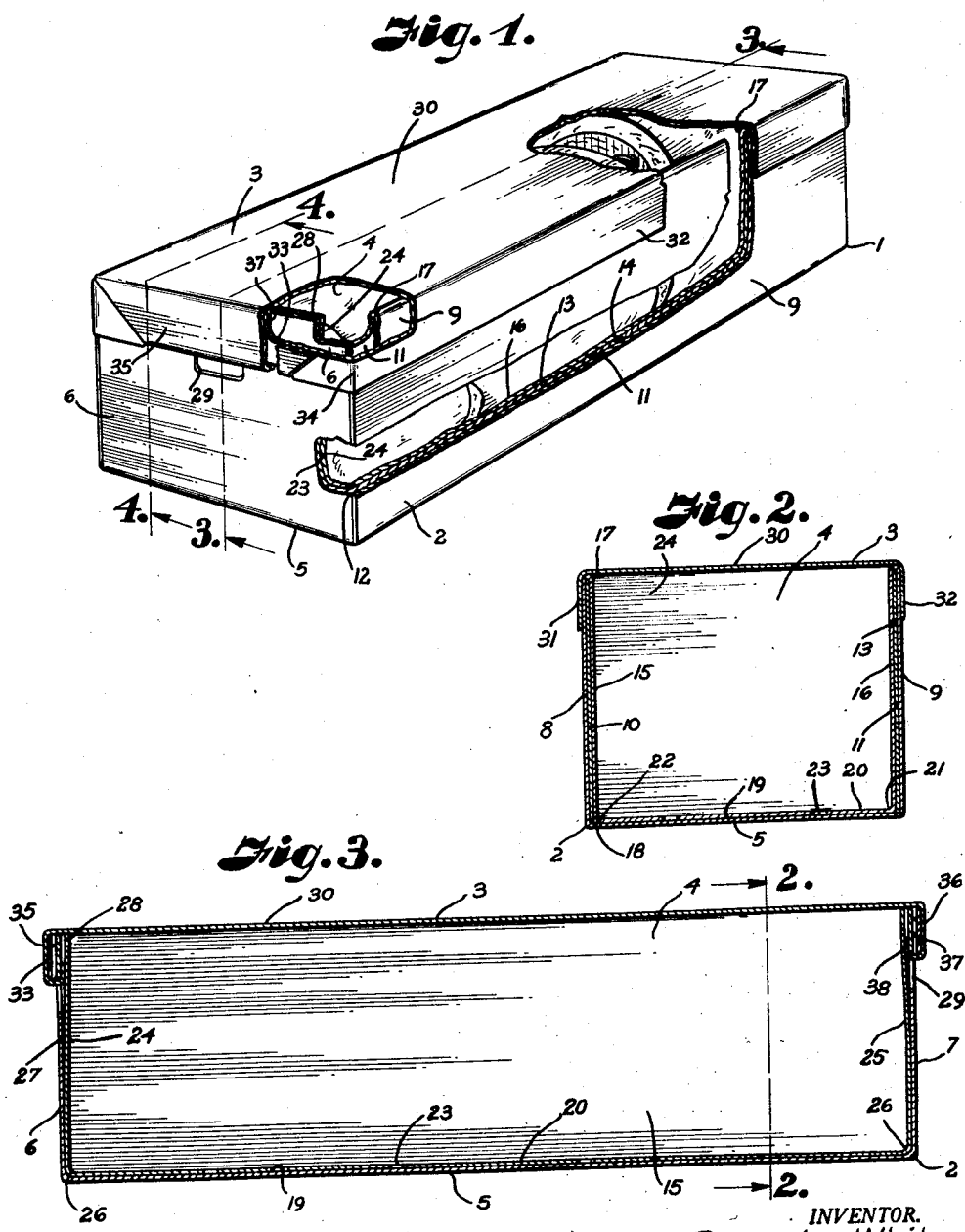
Nov. 10, 1959 — R. L. WHITE — 2,912,152
MOISTURE RETAINING CONTAINER
Filed Dec. 9, 1957
INVENTOR.
Roger L. White.

INVENTOR.
Roger L. White.
BY
Fishburn and Gold
ATTORNEYS.

United States Patent Office 2,912,152
Patented Nov. 10, 1959

2,912,152

MOISTURE RETAINING CONTAINER

Roger L. White, Lawrence, Kans., assignor to The Lawrence Paper Company, Lawrence, Kans., a corporation of Kansas Application December 9, 1957, Serial No. 701,602

4 Claims. (Cl. 229—14)

This invention relates to containers, and more particularly to containers for storage and shipment of products having moisture therein, and has for its principal object to provide a container having suitable strength for stacking and resisting lateral forces that is formed of a combination of corrugated paperboard and a moisture barrier whereby moisture is retained within the container and product.

In the boxing and shipping of meats and other products having moisture therein, and particularly those that are refrigerated, there is a tendency for the moisture to escape from the container with loss of moisture and shrinkage of the meat or product. In the past, wirebound boxes and the like have been used for shipping of meats, but due to the price involved, some meats have been shipped in containers formed of corrugated board. It is a recognized characteristic of the usual corrugated paperboard to absorb free moisture from the air, and when subjected to high humidity or liquid, the corrugated paperboard will become soft and lose its strength and stiffness. Some containers have been made with wax coating or other treatment on the corrugated board to waterproof the surfaces thereof so as to maintain the stiffness and strength of the corrugated board in humid conditions. However, in the shipping of meats, the meat is usually frozen and then when removed from cold storage and moved to places of warm temperature, there are meat drip liquids that move from the meat to the bottom of the container where it either collects in pools under the meat or escapes from the container through openings therein. If it escapes, the exterior of the container becomes wet and difficult to handle, and the storage area becomes unsightly. If the liquid remains in pools in the container, damage can occur in the meat product. Therefore, while waterproofed surfaces of the corrugated paperboard have tended to protect the board and maintain its strength and stiffness, there occurs either a collection of liquid in the container or an escape of liquid and moisture with shrinkage of the product.

Further objects of the present invention are to provide a container for moist products that will eliminate the difficulties set out in the above; to provide a container of corrugated board and a moisture barrier with the moisture barrier between paper portions of the board forming the walls whereby moisture in the container is absorbed by the inner paper portion of the walls to maintain moist conditions in the container but eliminate collection of liquid in pools on the inner surface of the walls thereof; to provide a container of corrugated paperboard wherein some of the liners or face sheets of said board are of paper fibers and others are of a combination of paper fiber and waterproofing such as bituminous material wherein said other liners form a moisture barrier and give stiffness and strength to the paper when moist and to thereby increase the strength and stiffness of the container walls; to provide such a container wherein the moisture barrier in the corrugated board walls prevents the moisture from inside the container from affecting the outer surface and the outer surface retains the dry strength of the conventional corrugated board; and to provide a moisture retaining container that is economical to manufacture, of a very strong structure which resists crushing, and is adapted for the shipping of meats or other products under moist conditions to reduce the shrinkage thereof.

In accomplishing these and other objects of the present invention, I have provided improved details of structure, the preferred form of which is illustrated in the accompanying drawings, wherein:

Fig. 1 is a perspective view of a container embodying the features of the present invention, with portions broken away to show the interior thereof.

Fig. 2 is a vertical sectional view through the container taken on the line 2—2, Fig. 3.

Fig. 3 is a vertical longitudinal sectional view through the container taken on the line 3—3, Fig. 1.

Figure 4:
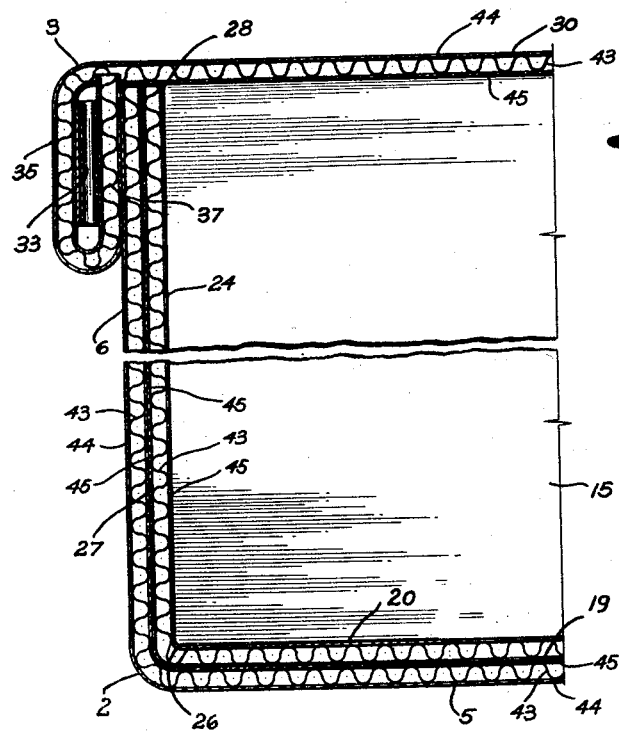
Fig. 4 is an enlarged sectional view through the container taken on the line 4—4, Fig. 1.
Figure 5:
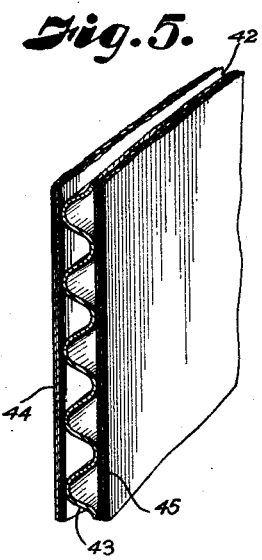
Fig. 5 is an enlarged partial perspective view of the corrugated board having the moisture barrier therein.
Figure 6:
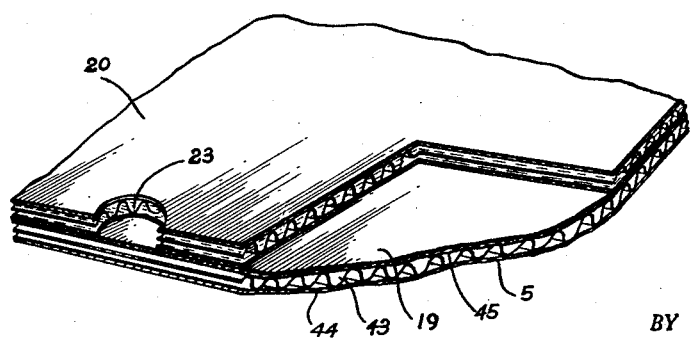
Fig. 6 is an enlarged partial perspective view of the bottom and inner liner therefor.

Referring more in detail to the drawings:

1 designates a container embodying the features of the present invention and generally including a container body 2 and a cover 3 having walls defining a closed storage chamber 4 therein, said walls being formed of corrugated paperboard with moisture barriers therein. The container illustrated is exemplary only, as the invention may be used in various container structures in which the relationship of the walls provides the association of absorbent paper portions and moisture barrier to protect both the container and the moist contents therein. While the container illustrated is specifically designed for use in the shipping of meats, the present invention is not to be limited thereto as it is obvious that containers having the arrangement of the paper and moisture barrier may be used for a wide variety of structures and purposes where moisture retention is desirable or necessary.

In the container illustrated, the body 2 includes a bottom wall 5 provided with upwardly extending end walls 6 and 7 and upwardly extending side walls 8 and 9, said side and end walls being integral with the bottom wall 5. The end walls 6 and 7 each have side flaps 10 and 11 that fold as at 12 adjacent the corners of the container body whereby said side flaps overlie the inner surfaces 13 of the side walls 8 and 9 in face to face engagement therewith. It is preferable that the side flaps 10 and 11 have a length slightly less than half the length of the side walls of the container body whereby the adjacent ends of the side flaps are separated as at 14. Side inner walls or panels 15 and 16 extend from the side walls 8 and 9 and fold as at 17 over the upper edge of the side flaps whereby the side inner walls 15 and 16 extend downwardly in the container body and engage the inner surfaces of the side flaps 10 and 11, with the bottom edge 18 of said inner side walls 15 substantially engaging the inner surface 19 of the bottom wall 5.

A bottom inner wall or panel 20 is positioned in the container body to overlie and substantially engage the upper face 19 of the bottom wall. The bottom inner wall is preferably connected with the bottom of the inner side wall 16 by a fold line 21 and the opposite side edge 22 of the inner bottom wall engages the inner surface of the inner side wall 15 at the lower edge thereof. The inner bottom wall has a plurality of spaced holes or apertures 23 extending therethrough perpendicularly to the face thereof, said apertures being of suitable size and spacing to perform as later described.

End inner walls or panels 24 and 25 are extensions from the ends 26 of the bottom inner wall and fold upwardly therefrom to lie inside of and substantially engage the inner surfaces 27 of the end walls 6 and 7. The end inner walls 24 and 25 are substantially co-extensive with the respective end walls 6 and 7 whereby the side edges of said inner end walls engage the side inner walls 15 and 16 and the top edge 28 of the end inner walls is substantially aligned with the upper edges of the end walls 6 and 7. In the illustrated structure, the end walls 6 and 7 have hand holds 29 spaced from the edges thereof.

The cover 3 has a top wall 30 substantially the same size and shape as the container body and has side flaps 31 and 32 that fold downwardly to extend over and slidably engage the exterior of the container side walls 8 and 9. The side flaps 31 and 32 each have corner flaps 33 that fold as at 34 adjacent the corners of the cover to extend around the corners of the container body and overlap portions of the end walls 6 and 7 of said container body. The cover 3 includes end flaps 35 and 36 that fold downwardly over the corner flaps 33, said end flaps having extensions 37 which fold under and/or behind the corner flaps 33. Tongues 38 are cut from the extensions 37 and are adapted to extend through the hand holds 29 and be positioned between the end walls 6 and 7 and the inner end walls 24 and 25 to secure the cover on the container.

It is preferable that all of the walls of both the container body and cover are formed of a corrugated board 42 having a corrugated liner 43 of desired number of plys of paper preferably waterproofed by having a bituminous content therein whereby said corrugated liner is moisture resistant and forms a moisture barrier. The corrugated board 42 has a face liner 44 of the usual paper in corrugated board that is capable of absorbing free moisture from the air. The other face liner 45 is waterproofed and preferably has a plurality of plys of paper with a bituminous content whereby the liner serves as a moisture barrier. If desired, the face liner 45 may have, for example, five plys with the three inner plys having a bituminous content and the two outer plys being of conventional paper stock in order that the outer surface of the liner will have the usual paper color and appearance. The corrugated liner 43 and face liner 45 are preferably of paper having a bituminous content such as is manufactured in accordance with the Hill et al. Patent No. 2,767,091, issued October 16, 1956.

The corrugated paperboard 42 is arranged in the container 1 whereby the bituminous content liner 45 forms the upper face 19 of the bottom wall 5 and the paper liner 44 forms the outer surface of said bottom wall or is exteriorly of the container with the liner 45 interiorly of the container. The end walls 6 and 7 and the side walls 8 and 9 being turned upwardly from the bottom wall 5 places the paper liner 44 of the corrugated board forming said walls on the exterior of the container with the liner 45 interiorly of the container. The inner side walls 10 and 11 being turned inwardly from the side walls 8 and 9 arranges the liner 45 of the inner side walls 15 and 16 in engagement with the liner 45 of the side walls 8 and 9, the liner 44 of the inner side walls 15 and 16 being to the interior of the container. The inner bottom wall 20 is turned to extend from the bottom of the inner side wall 16 and has the moisture resistant liner 45 engaging the upper face 19 of the bottom wall 5 with the moisture absorbent liner 44 to the interior of the container. Also, the liner 44 of the inner end walls 24 and 25 is inwardly of the container and the liner 45 of said walls is in engagement with the inner surfaces formed by the liner 45 of the end walls 6 and 7.

The cover 3 is also formed of the corrugated board 42 and arranged whereby the liner 45 thereof is the bottom surface of the top wall or towards the interior of the container, and the liner 44 forms the exterior surface of said cover.

In using a container or carton structure having the arrangement of the board liners, as illustrated and described, for containing meats or other moisture containing products, the cover 3 is removed and the product to be contained in the container is placed in the storage chamber therein, and the cover replaced on the container body 1. The inner surface of the cover being the liner 45 and having a bituminous content serves as a moisture barrier, and the corrugated liner of the cover also being of paper with a bituminous content serves as a further moisture barrier to prevent the moisture from the interior of the container from reaching the exterior of the cover. Therefore, the outer liner of the cover, which is the paper liner 44, remains dry and retains its natural strength. The liner 45 and the corrugated liner 43 are moisture resistant, thereby retaining stiffness and strength in the cover, and further serving as moisture barriers to prevent escape of the moisture content in the air in the storage chamber 4. The liner 44 of the inner end walls 24 and 25 and the inner side walls 15 and 16 being of paper capable of absorbing moisture from the air, will absorb and retain the moisture during freezing of the meats and the upper or inner liner bottom wall 20 also being of corrugated paper will absorb some moisture, but the moisture absorbed by the liner 44 of the inner side and end walls and inner bottom wall will be retained in said liner as the corrugated liners 43 and liners 45 of both the end walls 6 and 7 and inner end walls 24 and 25 and side walls 8 and 9 and inner side walls 15 and 16 serve as vapor barriers to prevent passage of the moisture therethrough whereby the moisture is retained in the container. Also, the liner 45 and corrugated liner 43 of the bottom wall 5 are interiorly of the container and prevent passage of moisture to the exterior of the bottom wall. This arrangement protects the outer surface of the outer side and end walls which is of the paper liner 44, and being dry it retains its strength to cooperate with the bituminous containing liners in maintaining suitable crushing strength for the entire container. If the air in the storage chamber 4 tends to be of reduced moisture content or humidity, moisture previously absorbed by the paper of the liner 44 of the inner side and end walls will be given off, tending to maintain the moisture condition in the container storage chamber, and the moist condition of said chamber 4 tends to reduce evaporation of moisture from the meat or othere product and thereby reduce the shrinkage thereof. However, there will be some liquid dripping from the meat as it thaws which will further tend to maintain the moist conditions in the containers, and excess liquid will pass through the apertures 23 and tend to collect in the passage formed by the corrugated member between the outer face liners of the inner bottom wall 20, eliminating any pools of liquid that might tend to collect on the bottom of the container. The apertures 23 may be formed to extend only through the upper liner of the bottom inner wall whereby the corrugated liner and bottom liner will tend to hold any collected liquids thereabove.

It is believed obvious that I have provided a container structure of a corrugated board medium with moisture barriers therein to maintain the strength and stiffness of the walls of the container and also to retain moist conditions in the container for better preservation of moist products therein.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A shipping container for moist products comprising, a carton having spaced side, end, bottom and top walls made of double face corrugated paperboard waterproofed as to the inner face of each of said walls, said walls providing a storage chamber in each carton, inner end and side walls in contacting overlying relation to the respective carton side and end walls, said inner end and side walls being made of double face corrugated paperboard waterproofed as to the face adjacent the respective carton side and end walls with the other face of said inner and end and side walls being absorbent of moisture, and a bottom inner wall supported in the carton on the bottom wall and made of double face corrugated paperboard absorbent of moisture, said bottom inner wall having a plurality of spaced apertures extending therethrough perpendicularly of the faces thereof whereby liquids pass through the apertures and between the faces of said bottom inner wall, said waterproofed faces of the carton walls and inner side and end walls being moisture barriers to retain moisture in the carton chamber for prevention of shrinkage of moisture bearing products therein.

2. A shipping container for moist products comprising, a carton having spaced side, end, bottom and top walls each of which is made of double face corrugated paperboard having a laminated paper sheet corrugated and sandwiched between laminated paper face sheets with the corrugated sheet and face sheet forming the inner face of each of said walls having a content of bituminous material whereby they are substantially resistant to passage of moisture therethrough and form a moisture barrier in said walls, inner end and side walls in contacting overlying relation to the respective carton side and end walls and made of the same double face corrugated board as said carton walls with the face having the bituminous content of the inner walls adjacent the respective carton walls whereby the inner face of said inner walls is absorbent of moisture, and a bottom inner wall supported in the carton on the bottom wall and made of double face corrugated paperboard absorbent of moisture, said bottom inner wall having a plurality of spaced apertures extending therethrough perpendicularly of the faces thereof whereby liquids pass through the apertures and between the faces of said bottom inner wall and is retained in the interior of the carton to maintain a moist condition preventing shrinkage of moisture bearing products therein.

3. A container of the character described comprising, a substantially rectangular container body having a bottom wall, upturned end walls joining the bottom wall along oppositely disposed foldable lines, upturned side walls joining the bottom wall along other oppositely disposed foldable lines, side inner walls joining the side walls along foldable lines and extending inwardy and downwardly from the upper edges of the side walls and in overlying relation to the side walls, a bottom inner wall overlying the bottom wall, end inner walls joining the bottom inner wall along foldable lines and extending upwardly from the end edges of the bottom inner wall in engagement with the end walls, and a cover for the container body having a top wall and outwardly and downwardly turned flaps on the side and end edges thereof, said carton and cover walls being made of double face corrugated paperboard waterproofed as to the inner face of each of the bottom, side and end walls of the container body and top wall of the cover and as to the outer faces of the side and end inner walls, the inner faces of the side and end inner walls and the bottom inner wall being of paperboard absorbent of moisture, said bottom inner wall having a plurality of spaced apertures extending therethrough perpendicularly of the faces thereof whereby liquids pass through the apertures and between the faces of said bottom inner wall, said waterproofed faces of the carton walls and side and end inner walls being moisture barriers to retain moisture in the container for prevention of shrinkage of moisture bearing products therein.

4. A container of the character described comprising, a substantially rectangular container body having a bottom wall, upturned end walls joining the bottom wall along oppositely disposed foldable lines, upturned side walls joining the bottom wall along other oppositely disposed foldable lines, side wing flaps joining the sides of each of the end walls along foldable lines and extending inwardly to lie along the side walls, side inner walls joining the side walls along foldable lines and extending inwardly downwardly from the upper edges of the side walls and in engagement with the side flaps whereby the side walls, side inner walls and side flaps cooperate in forming triple thickness sides in the container, a bottom inner wall overlying the bottom wall, end inner walls joining the bottom inner wall along foldable lines and extending upwardly from the end edges of the bottom inner wall in engagement with the end walls to cooperate therewith in forming a double thickness ends in the container, and a cover for the container body having a top wall and outwardly and downwardly turned flaps on the sides and end edges thereof, said carton and cover walls being made of double face corrugated paperboard waterproofed as to the inner face of each of the bottom, side and end walls of the container body and top wall of the cover and as to the outer faces of the side and end inner walls, the inner faces of the side and end inner walls and the bottom inner wall being of paperboard absorbent of moisture, said bottom inner wall having a plurality of spaced apertures extending throughthrough perpendicularly of the faces thereof whereby liquids pass through the apertures and between the faces of said bottom inner wall, said waterproofed faces of the carton walls and side and end inner walls being moisture barriers to retain moisture in the container for prevention of shrinkage of moisture bearing products therein.

References Cited in the file of this patent

UNITED STATES PATENTS

| | | |
|---|---|---|
| 2,278,782 | Harvey et al. | Apr. 7, 1942 |
| 2,367,520 | Patek | Jan. 16, 1945 |
| 2,632,723 | Bennett | Mar. 24, 1953 |
| 2,849,322 | Brucker | Aug. 26, 1958 |